United States Patent
Sugimoto

(10) Patent No.: US 7,971,536 B2
(45) Date of Patent: Jul. 5, 2011

(54) CARRIAGE-TYPE CONVEYANCE DEVICE

(75) Inventor: Katsuhiro Sugimoto, Shiga (JP)

(73) Assignee: Daifuku Co., Ltd (JP)

( * ) Notice: Subject to any disclaimer, the term of this patent is extended or adjusted under 35 U.S.C. 154(b) by 241 days.

(21) Appl. No.: 12/377,298

(22) PCT Filed: Jan. 29, 2008

(86) PCT No.: PCT/JP2008/051278
§ 371 (c)(1),
(2), (4) Date: Feb. 12, 2009

(87) PCT Pub. No.: WO2008/093666
PCT Pub. Date: Aug. 7, 2008

(65) Prior Publication Data
US 2010/0218697 A1    Sep. 2, 2010

(30) Foreign Application Priority Data

Jan. 30, 2007  (JP) .................................. 2007-018645

(51) Int. Cl.
*B65G 13/00* (2006.01)
(52) U.S. Cl. ...................... 104/48; 198/463.3
(58) Field of Classification Search ............ 104/48, 104/50, 128, 130.07, 275; 246/375; 29/824; 414/427, 663, 749.1, 391; 198/465.3, 346.1, 198/346.2, 346.3, 463.3, 459.8, 414; 254/122; 187/204, 207, 211, 269
See application file for complete search history.

(56) References Cited

U.S. PATENT DOCUMENTS

| | | | |
|---|---|---|---|
| 7,077,620 B2 * | 7/2006 | Ishioka | 414/749.1 |
| 7,458,455 B2 * | 12/2008 | Nakamura et al. | 198/463.3 |
| 7,658,273 B2 * | 2/2010 | Nakamura et al. | 198/414 |
| 7,658,275 B2 * | 2/2010 | Hayashi | 198/459.8 |

FOREIGN PATENT DOCUMENTS

JP   2006-62805   3/2006

* cited by examiner

*Primary Examiner* — Mark T Le
(74) *Attorney, Agent, or Firm* — St. Onge Steward Johnston & Reens LLC

(57) ABSTRACT

A conveyance device using a carriage having an object support base movable vertically controlled by cam rails on the floor side, has an automatic lock for locking the object support base at a rising limit position. Unlocking cam follower rollers of the automatic lock are provided higher than a conveyance carriage supporting level of a carriage traveling path. A cam follower roller for elevating the object support base is positioned higher than the conveyance carriage supporting level when the object support base is at the rising limit position. In an area in which the carriage traveling path and the aisle cross each other, a crossing aisle floor member is laid at the same level as the conveyance carriage supporting level, and the conveyance carriage can pass through this aisle crossing area in a state that the object support base is locked at the rising limit position by the automatic lock.

4 Claims, 9 Drawing Sheets

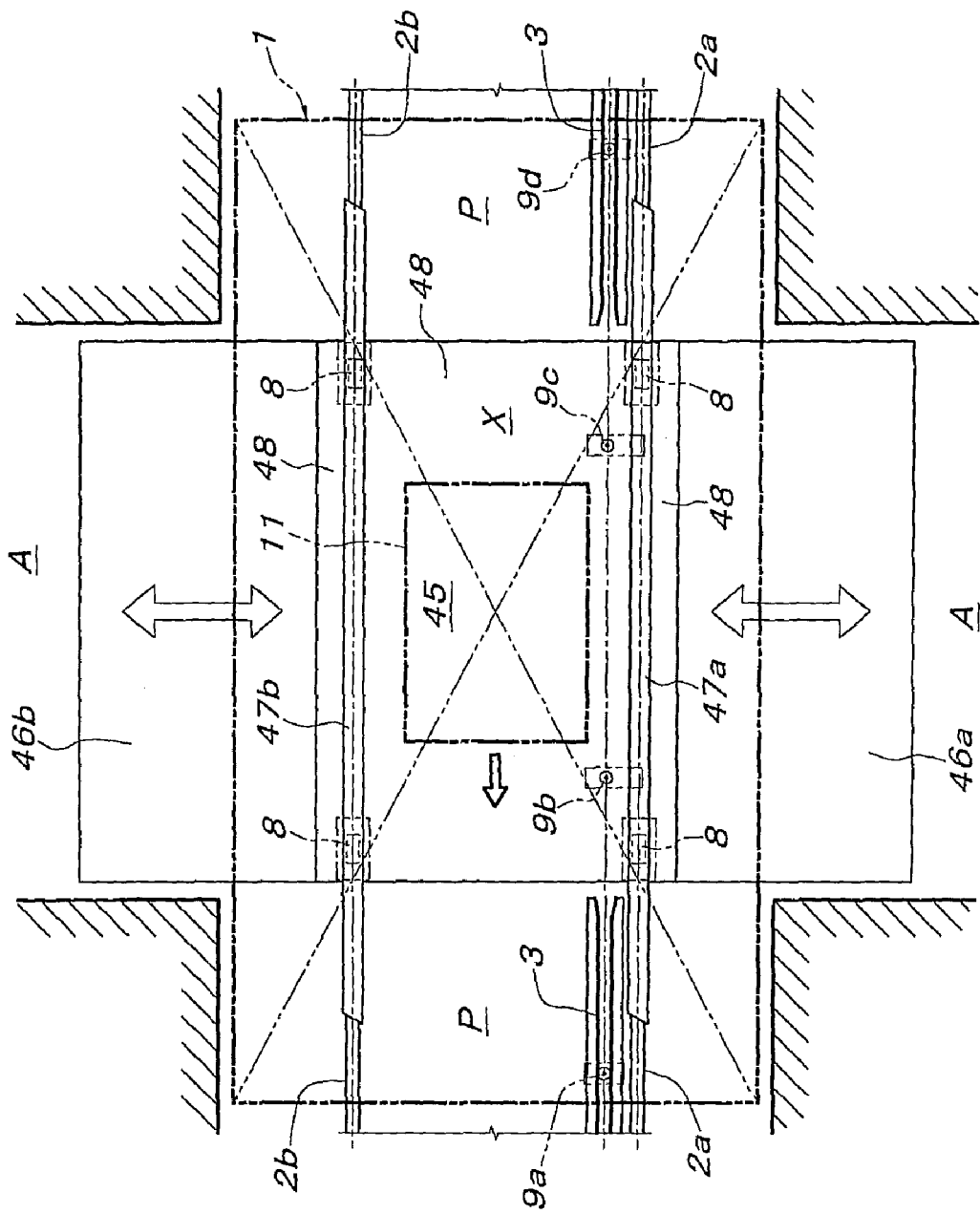

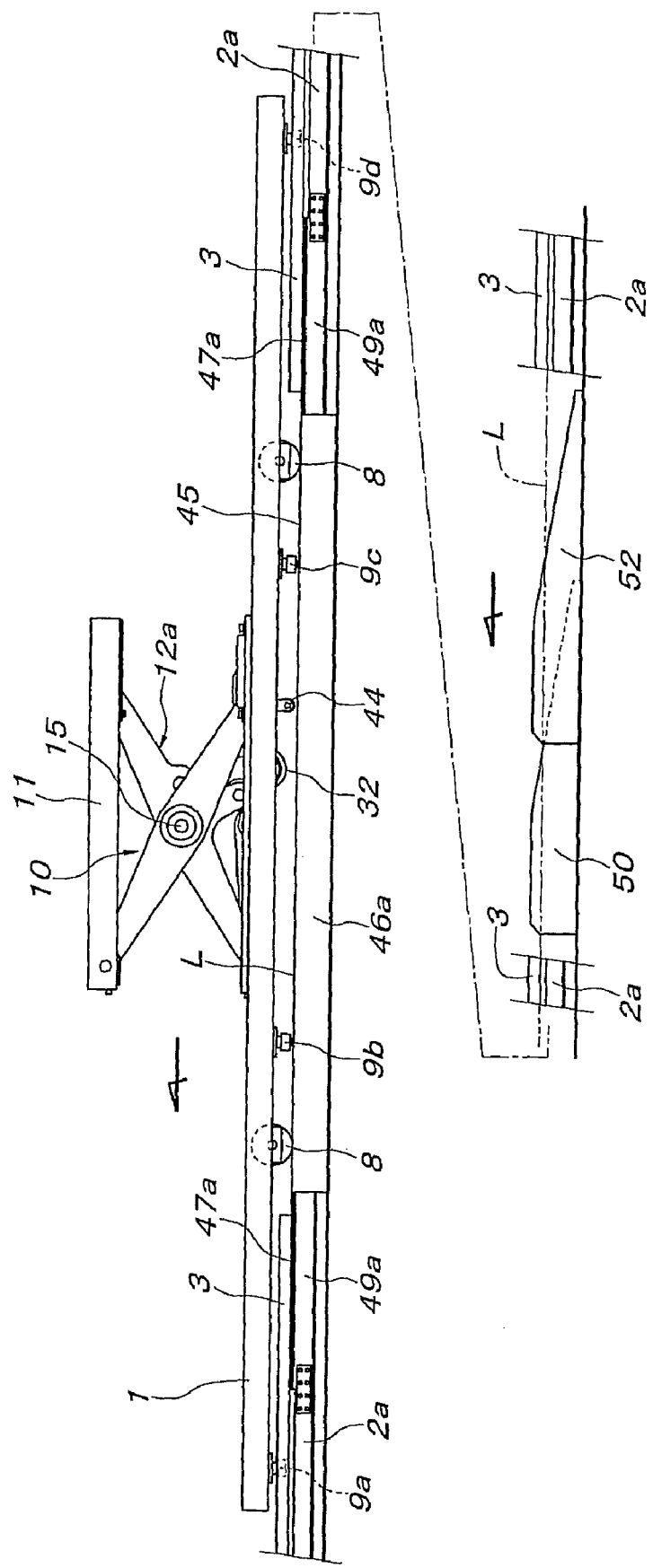

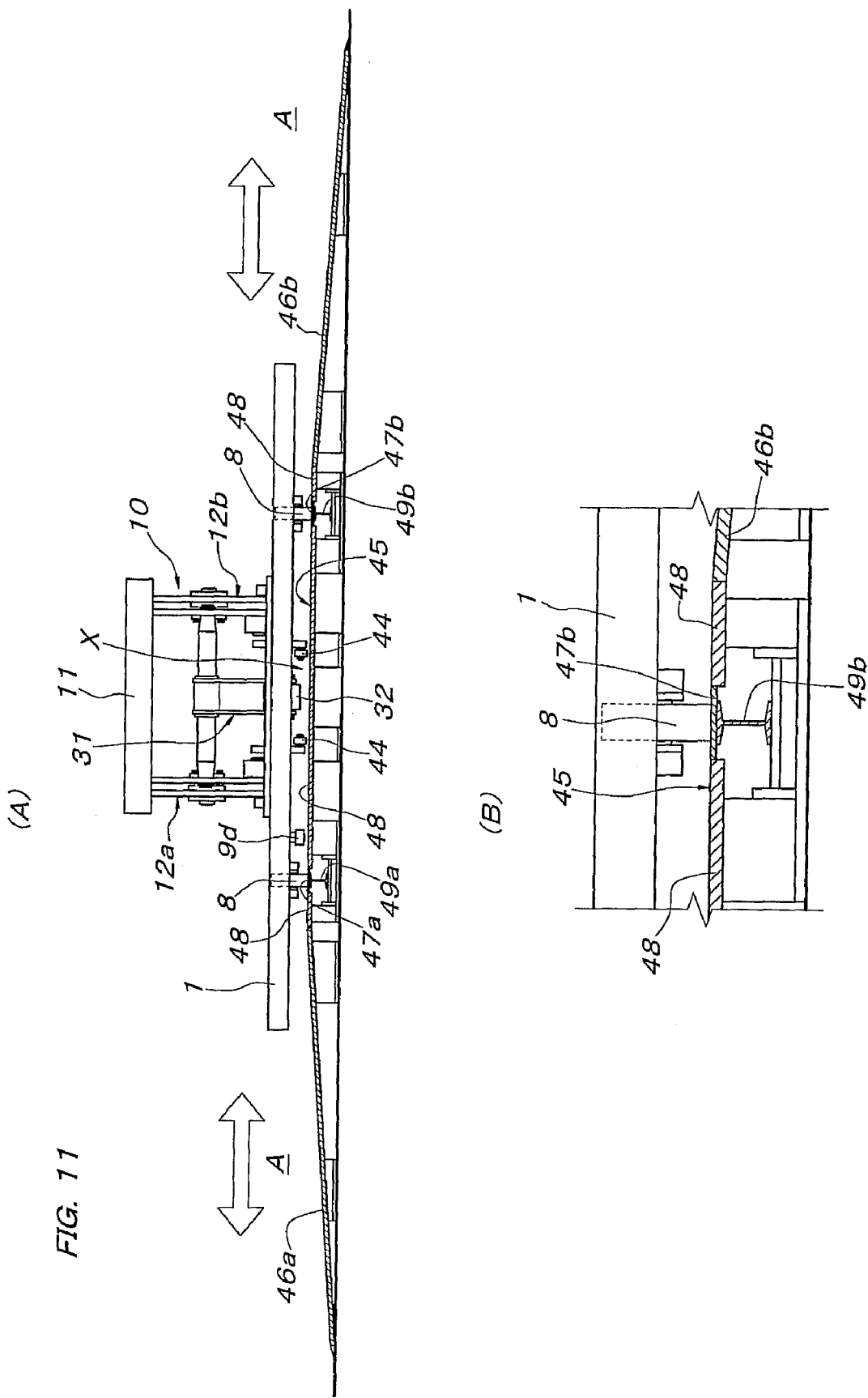

CARRIAGE-TYPE CONVEYANCE DEVICE

TECHNICAL FIELD

The present invention relates to a carriage-type conveyance device including an object support base movable vertically controlled by cam rails on the floor side.

BACKGROUND ART

Such a carriage-type conveyance device, that is, a carriage-type conveyance device in which a conveyance carriage supported so as to travel on guide rails laid on the floor surface is provided with an object support base movable vertically and elevating cam follower rollers which move vertically in conjunction with a vertical movement of the object support base, and on the conveyance carriage traveling path side, elevating cam rails which push up the elevating cam follower rollers are laid, is conventionally known as disclosed in Patent document 1, etc.

Patent document 1 Japanese Published Unexamined Patent Application No. 2006-62805

DISCLOSURE OF THE INVENTION

Problem to be Solved by the Invention

In the carriage-type conveyance device constructed as described above, even when the object support base is positioned at its lowering limit position, by positioning the elevating cam follower rollers on the bottom of the conveyance carriage to be higher than a conveyance carriage supporting level of the guide rails which support and guide the conveyance carriage, even if the conveyance carriage traveling path must be laid across an aisle for a forklift and a carriage, in this aisle crossing area, regardless of the elevating position of the object support base, the forklift and carriage can be made to pass and move through the guide rail positions without problems by laying a crossing aisle floor member at the same level as the conveyance carriage supporting level, however, the elevating space of the elevating cam follower rollers must be secured to be higher than the conveyance carriage supporting level, so that it is difficult to construct a low-floor structure of the conveyance carriage.

Means for Solving the Problem

An object of the invention is to provide a carriage-type conveyance device which can solve the conventional problem. Indicating the means by reference numerals of the embodiment described later, in the construction of a first aspect of the invention, a carriage-type conveyance device includes a conveyance carriage 1 which is supported so as to travel on guide rails 2a and 2b laid on the floor surface and is provided with an object support base 11 movable vertically, elevating cam follower rollers 30a, 30b, and 32 which move vertically in conjunction with a vertical movement of the object support base 11, an automatic lock means 39 which locks the object support base 11 being raised at a rising limit position, and unlocking cam follower rollers 44 for unlocking the automatic lock means 39, and elevating cam rails 50 and 52 which push up the elevating cam follower rollers 30a, 30b, and 32 and unlocking cam rails 51 which switch the unlocking cam follower rollers 4 to unlocking positions, laid on the conveyance carriage traveling path side, wherein the unlocking cam follower rollers 44 are disposed higher than a conveyance carriage supporting level L of the guide rails 2a and 2b, the elevating cam follower rollers 30a, 30b, and 32 project further downward than the conveyance carriage supporting level L when the object support base 11 is at a lowering limit position, and positioned higher than the conveyance carriage supporting level L when the object support base 11 is at a rising limit position, and in an aisle crossing area X crossing a conveyance carriage traveling path P, a crossing aisle floor member 45 is laid at the same level as the conveyance carriage supporting level L, and in the front and rear of this crossing aisle floor member 45, slope floor members 46a and 46b for filling the level difference from the floor surface are provided, and in this aisle crossing area X, elevating cam rails 50 and 52 which push up the object support base 11 to the rising limit position are laid on the upstream side of the aisle crossing area X so that the conveyance carriage 1 can pass through the area in a state that the object support base 11 is locked at the rising limit position by the automatic lock means 39.

To carry out the present invention constructed as described above, in detail, as described in a second aspect of the invention, wheels 8 on the conveyance carriage 1 side to roll on the guide rails 2a and 2b are flange-less wheels which have only peripheral surfaces to roll on wheel support surfaces of the guide rails 2a and 2b, and on the bottom of the conveyance carriage 1, a plurality of vertical axis rollers 9a through 9d are arranged in series at appropriate intervals in the traveling direction higher than the conveyance carriage supporting level L, and on the conveyance carriage traveling path P excluding the aisle crossing area X, an orientation restricting guide rail 3 which restricts the orientation of the conveyance carriage 1 by engaging with the vertical axis rollers 9a through 9d is laid, and the intervals and the number of vertical axis rollers 9a through 9d can be set so that the at least two vertical axis rollers always engage with the orientation restricting guide rail 3 in the front or rear of the aisle crossing area X or across the aisle crossing area X when the conveyance carriage 1 passes through the aisle crossing area X.

When the construction described in the second aspect is employed, as described in a third aspect of the invention, it is possible that the guide rails 2a and 2b are laid on the conveyance carriage traveling path P excluding the aisle crossing area X, and inside the aisle crossing area X, the wheels 8 on the conveyance carriage 1 side roll and move on the crossing aisle floor member 45. As described in a fourth aspect of the invention, it is possible that the crossing aisle floor member 45 includes conveyance carriage supporting band-like floor members 47a and 47b which connect the wheel support surfaces of the guide rails 2a and 2b in the front and rear of the aisle crossing area X, and support rail members 49a and 49b which support the conveyance carriage supporting band-like floor members 47a and 47b are laid on the floor surface.

Effects of the Invention

According to the carriage-type conveyance device described in the first aspect of the present invention, a space on the floor lower than the conveyance carriage supporting level of the guide rails for supporting and guiding the conveyance carriage laid on the floor surface is also used as the elevating space of the elevating cam follower rollers for pushing-up the object support base, so that in comparison with the construction in which only the space higher than the conveyance carriage supporting level is used as the elevating space of the elevating cam follower rollers, it becomes easy to construct a low-floor structure of the conveyance carriage. In addition, in the aisle crossing area crossing the conveyance carriage traveling path, the conveyance carriage travels in a state that the object support base is locked at its rising limit position by the automatic lock means, so that it is not necessary to lay elevating cam rails which push up the elevating cam follower rollers to positions higher than the conveyance carriage supporting level in this aisle crossing area, and the unlocking cam follower rollers are positioned higher than the conveyance carriage supporting level, so that in the aisle crossing area, by the crossing aisle floor member laid at the same level as the conveyance carriage supporting level and the slope floor members disposed to fill the level difference from the floor surface in the front and rear of the crossing aisle floor member, a forklift and a carriage can be made to smoothly and safely pass and move through the area. As a matter of course, the device can be constructed without forming a pit on the floor surface of the conveyance carriage traveling path including the aisle crossing area, so that the cost of equipment can be made low.

To carry out the present invention, by using flanged wheels as the wheels of the conveyance carriage, the flanges of the wheels engage with the guide rails and restrict the orientation (posture) of the conveyance carriage, however, in this case, slits which the flanges of the wheels freely fit in and pass through must be formed in the crossing aisle floor member laid in the aisle crossing area, and the crossing aisle floor surface cannot be formed into a flat continuous surface. However, when carrying out the present invention by employing the construction described in the second aspect, it is not necessary to form the slits which the flanges of the flanged wheels freely fit in and pass through on the crossing aisle floor member laid in the aisle crossing area, and the crossing aisle floor surface can be formed into a flat continuous surface, and a more safe and smooth traveling of a vehicle, etc., on the crossing aisle is realized. As a matter of course, any accident involving an unexpected traveling direction change when the conveyance carriage passes through the aisle crossing area can be prevented by the plurality of vertical axis rollers on the conveyance carriage side and the orientation restricting guide rail laid on the conveyance carriage traveling path in the front and rear of the aisle crossing area, so that the conveyance carriage can be made to safely travel and pass through the aisle crossing area without a dangerous situation where the conveyance carriage that has passed through the aisle crossing area comes out of the traveling path on the downstream side of the aisle crossing area.

When the construction described in the second aspect is employed, according to the construction described in the third aspect, it becomes easier to form the entire crossing aisle floor surface into a smooth flat surface than in the case where the floor surface in the aisle crossing area is formed by wheel rolling support surfaces of the guide rails laid across the aisle crossing area and the crossing aisle floor member laid so as to avoid the guide rails. Further, according to the construction described in the fourth aspect, in the crossing aisle floor member, portions which the wheels of the conveyance carriage roll on and pass through are formed of conveyance carriage supporting band-like floor members, so that only the conveyance carriage supporting band-like floor members can be replaced according to wearing, and in addition, the conveyance carriage support band-like floor members are supported by supporting rail members so as to bear a great load.

BRIEF DESCRIPTION OF THE DRAWINGS

FIG. 9 is a plan view showing a construction of an aisle crossing area in a conveyance carriage traveling path;

FIG. 10 is a partially cut-away side view showing a construction of the same aisle crossing area and object support base elevating cam rails on the upstream side of the aisle crossing area; and FIG. 11A is a longitudinal sectional back view showing the construction of the same aisle crossing area and FIG. 11B is an enlarged view of a part of the same.

BEST MODE FOR CARRYING OUT THE INVENTION

Figure 1:
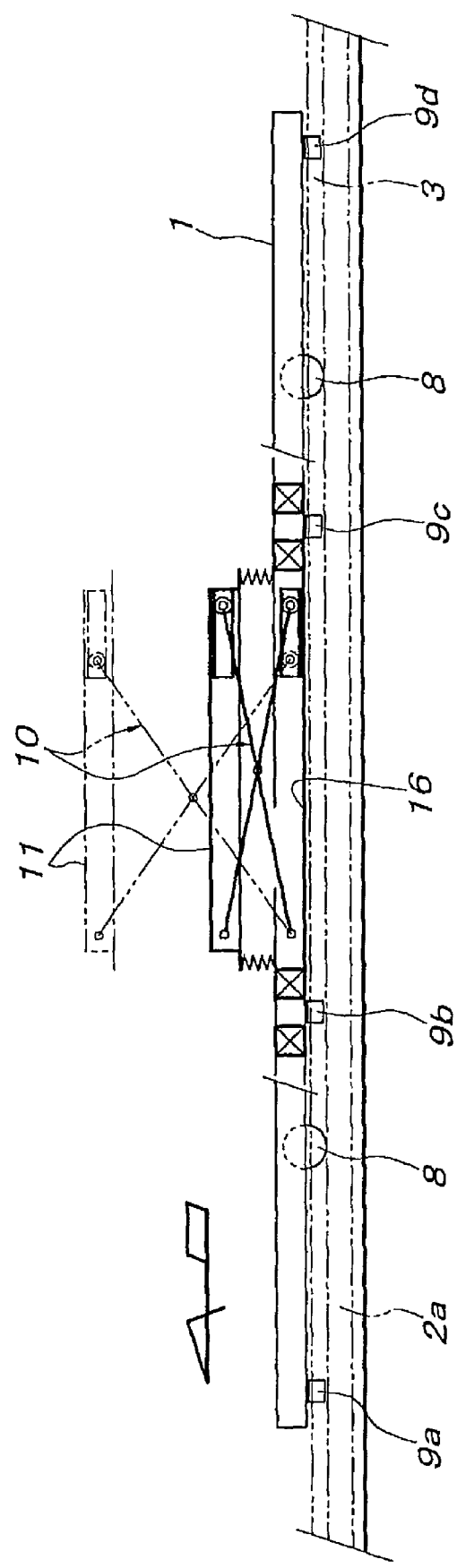
FIG. 1 is a schematic partial longitudinal side view describing the entire construction of a conveyance carriage.
Figure 2:
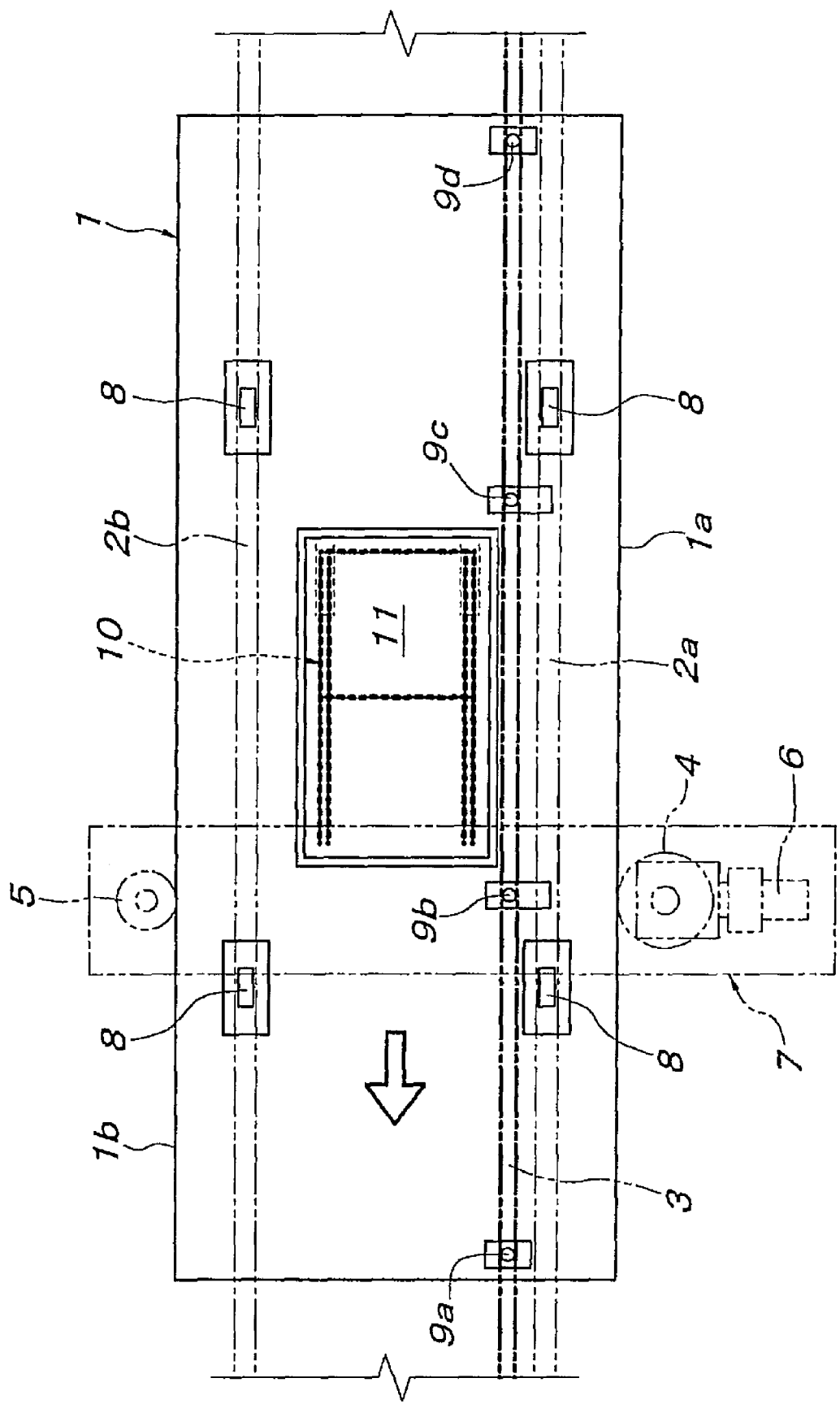
FIG. 2 is a schematic plan view describing the entire construction of the conveyance carriage.
Figure 3:
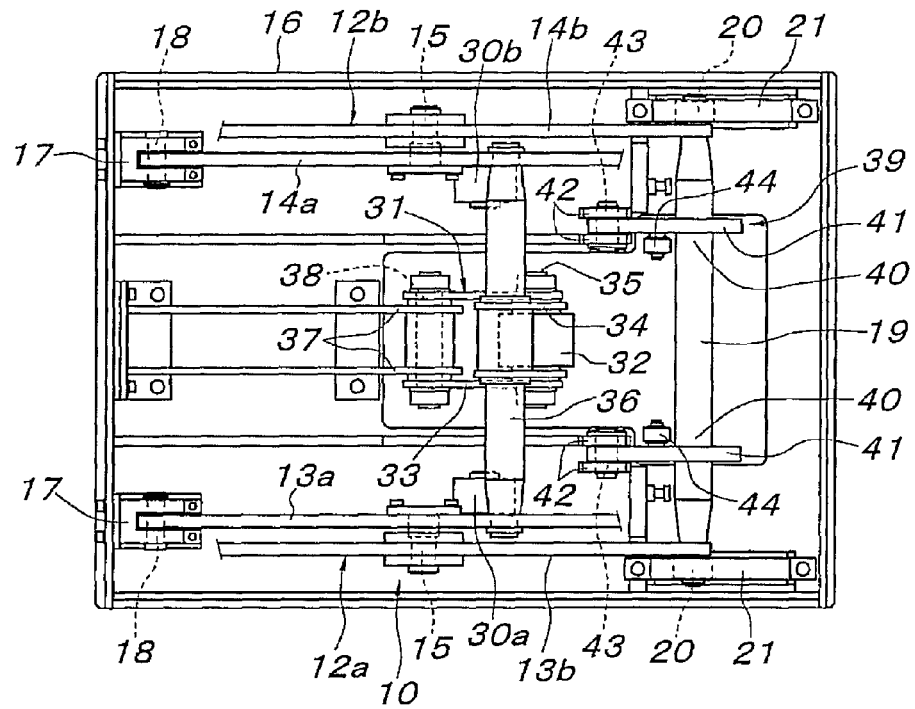
FIG. 3 is across-sectional plan view showing a crosslink mechanism when an object support base is at a rising limit position.

A detailed embodiment of the present invention will be described hereinafter with reference to the accompanying drawings. In FIG. 1 and FIG. 2, the reference numeral 1 denotes a conveyance carriage which travels on a traveling path constituted by a pair of left and right supporting guide rails 2a and 2b laid on the floor surface and one orientation restricting guide rail 3 laid close to one guide rail 2a and parallel to the guide rails 2a and 2b. A traveling drive means for making the conveyance carriage 1 travel is not especially limited, however, in this embodiment, as shown by the imaginary lines in FIG. 2, a friction drive type traveling drive means 7 including a friction drive wheel 4 which comes into pressure contact with a friction drive surface 1a extending across the entire carriage length formed on one side surface parallel to the traveling direction of the conveyance carriage 1, a backup roller 5 which comes into contact with a backup surface 1b formed on the other side surface parallel to the traveling direction of the conveyance carriage 1 and sandwiches the conveyance carriage 1 between the same and the friction drive wheel 4, and a motor 6 which drives and rotates the friction drive wheel 4, is arranged at an appropriate position in the traveling path.

Figure 5:
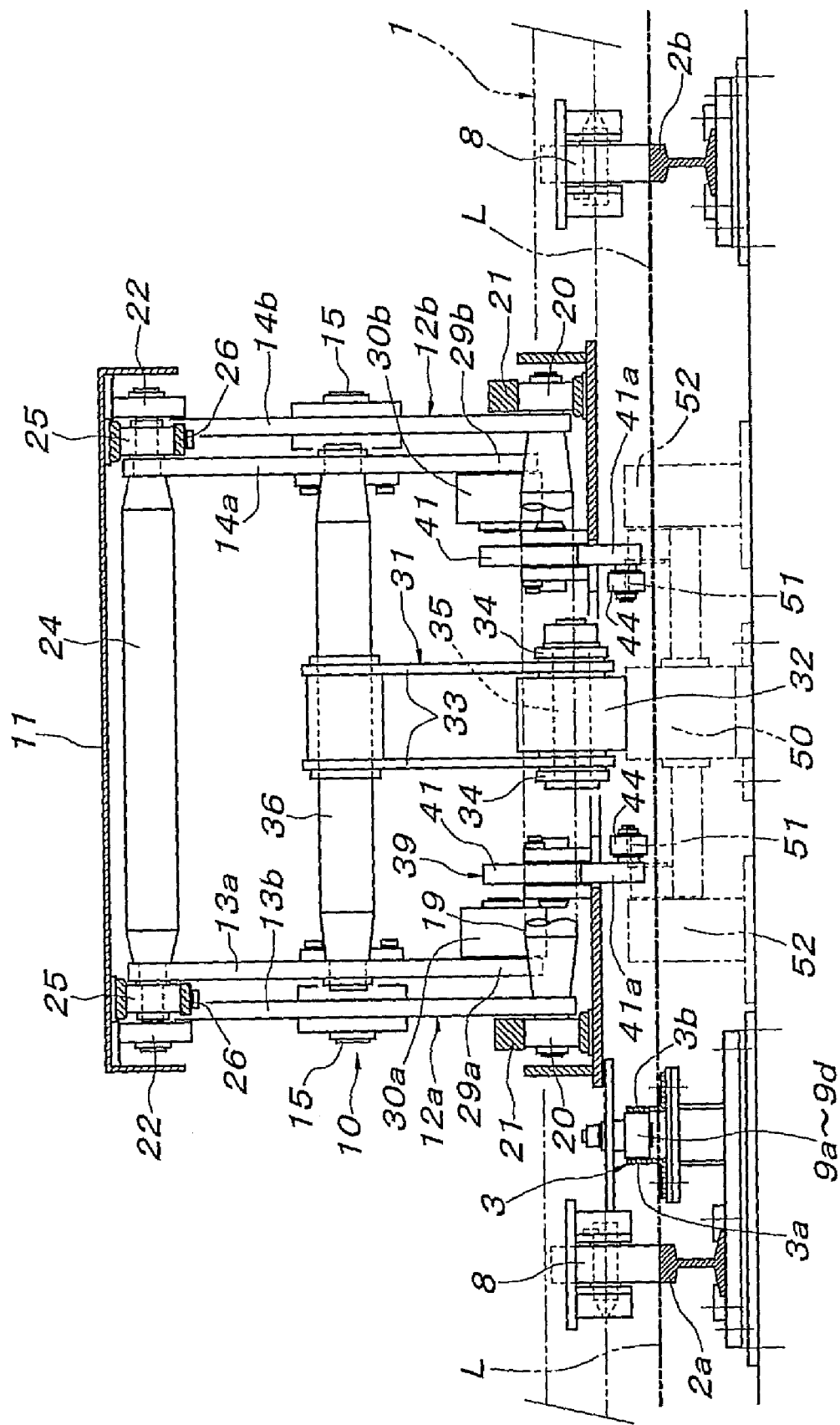
FIG. 5 is a longitudinal sectional back view showing the main portion when the object support base is at the rising limit position.

The conveyance carriage 1 is provided with two front and rear pairs of left and right wheels 8 (wheels without flanges to be engaged with the guide rails 2a and 2b) which roll on the pair of left and right supporting guide rails 2a and 2b and four vertical axis rollers 9a through 9d which engage with the orientation restricting guide rail 3. In this embodiment, as shown in FIG. 5, the orientation restricting guide rail 3 consists of a pair of left and right rail members 3a and 3b, and the vertical axis rollers 9a through 9d freely fit between the pair of left and right rail members 3a and 3b, however, it is also allowed that one vertical plate-like rail member is sandwiched by a pair of left and right vertical axis rollers. In either case, as shown in FIG. 5, the four vertical axis rollers 9a through 9d project downward from the bottom surface of the conveyance carriage 1, however, they are positioned higher than the conveyance carriage supporting level L on the traveling path side, that is, higher than the conveyance carriage supporting level L equal to the level of the wheel support surfaces of the pair of left and right supporting guide rails 2a and 2b, and the vertical axis rollers are arranged at substantially even intervals in a state that the vertical axis rollers 9a and 9d on both front and rear ends are positioned in both front and rear ends of the conveyance carriage 1.

On the conveyance carriage 1, an object support base 11 supported movably vertically via a crosslink mechanism 10 is provided at substantially the central position. Hereinafter, this is described in detail with reference to FIG. 3 through FIG. 6. The crosslink mechanism 10 is formed by arranging two crosslinks 12a and 12b parallel to the traveling direction so as to be parallel to each other on both lower left and right sides of the object support base 11.

The pair of left and right crosslinks 12a and 12b of the crosslink mechanism 10 consist of two links 13a and 13b and 14a and 14b whose central crossing portions are pivotally attached to each other by central fulcrum shafts 15 concentric with each other, and among the two pairs of links 13a through 14b, the front ends of both links 13a and 14a on the inner sides are pivotally attached to a pair of left and right bearing members 17 provided on a support frame 16 on the conveyance carriage 1 side so as to swing up and down by position-fixed fulcrum shafts 18 concentric with each other, and the rear ends of the links 13a and 14a are joined by a common sliding fulcrum shaft 24, and rollers 25 axially supported on both ends of the common sliding fulcrum shaft 24 are fitted to a pair of left and right front-back slide guides 26 provided on the rear end lower side of the object support base 11 so as to roll forward and rearward. Among the two pairs of links 13a through 14b, front ends of the links 13b and 14b on the outer sides are pivotally attached to a pair of left and right bearing members 22 provided just above the pair of left and right bearing members 17 on the front end lower side of the object support base 11 by position-fixed fulcrum shafts 23 concentric with each other, and the rear ends of the links 13b and 14b are joined by a common sliding fulcrum shaft 19, and rollers 20 supported on both ends of the common sliding fulcrum shaft 19 are fitted to a pair of left and right front-back slide guides 21 provided just below the front-back slide guides 26 on the support frame 16 on the conveyance carriage 1 side so as to roll forward and rearward.

Figure 4:
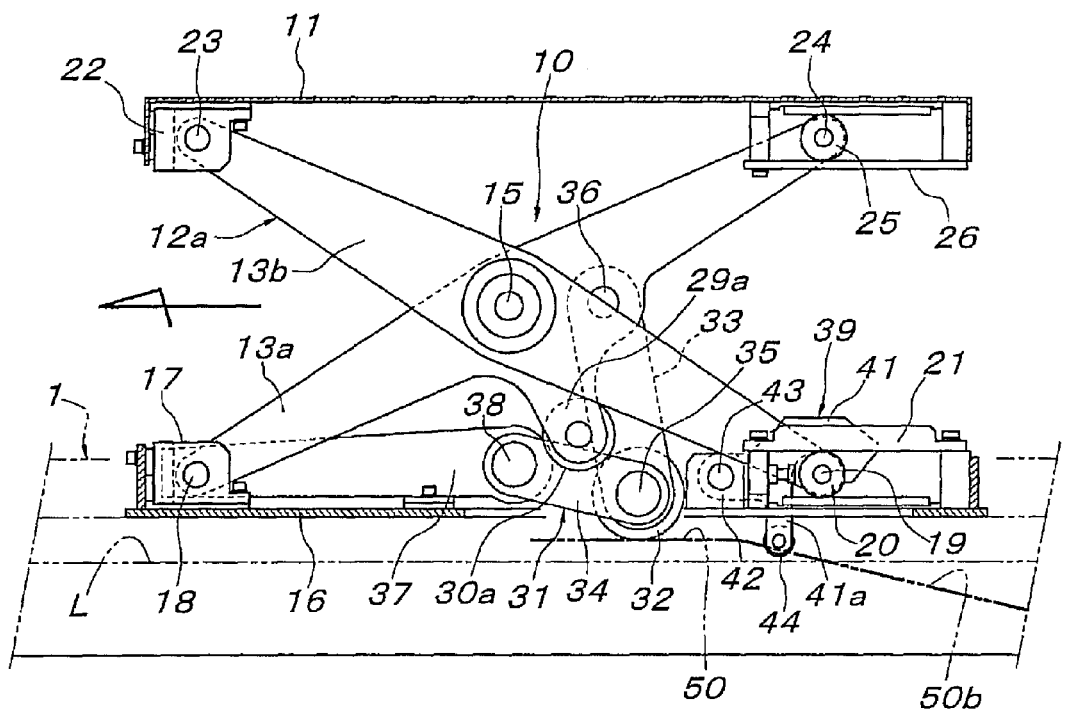
FIG. 4 is a longitudinal sectional side view showing a main portion when the object support base is at the rising limit position.
Figure 8:
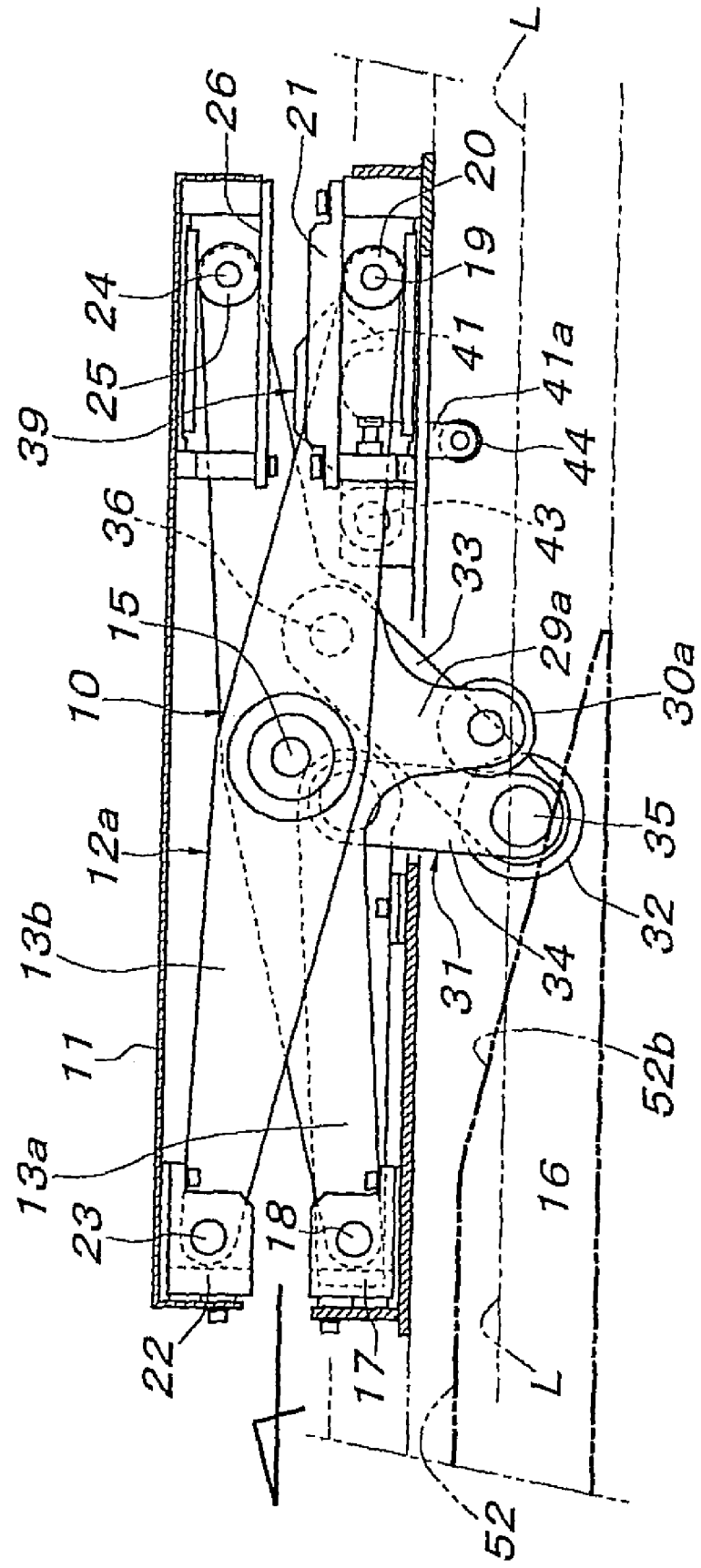
FIG. 8 is a longitudinal sectional side view of the main portion showing a state that the object support base is at its lowering limit position.

In the crosslink mechanism 10, as elevating cam follower rollers, a pair of left and right first cam follower rollers 30a and 30b and one second cam follower roller 32 are installed. The first cam follower rollers 30a and 30b are axially supported concentrically with each other on the lower ends of projections 29a and 29b provided continuously downward from inner links 13a and 14a of the two pairs of links 13a through 14b constituting the pair of left and right crosslinks 12a and 12b. The projections 29a and 29b are continuously provided downward from positions near the central fulcrum shafts 15 of both inner links 13a and 14b, and when the object support base 11 is at the rising limit position as shown in FIG. 4, the cam follower rollers 30a and 30b are positioned higher than the bottom surface of the conveyance carriage 1, and when the object support base 11 is at the lowering limit position as shown in FIG. 8, the cam follower rollers 30a and 30b project downward from the bottom surface of the conveyance carriage 1.

The second cam follower roller 32 is axially supported on a toggle link 31 provided parallel to the crosslink mechanism 10. In other words, the toggle link 31 is formed by joining a long link 33 and a short link 34 to each other by an intermediate folding fulcrum shaft 35, and each of the links 33 and 34 consists of a pair of left and right link units, and the second cam follower roller 32 is axially supported by the intermediate folding fulcrum shaft 35 between the link units of the long link 33 on the inner side. This toggle link 31 is disposed substantially at the center between the pair of left and right crosslinks 12a and 12b, and the free ends of the long link 33 are pivotally attached by a shaft-like cross member (support shaft member) 36 laid horizontally between both inner links 13a and 14a at a position slightly closer to the common sliding fulcrum shafts 19 and 24 than the central fulcrum shafts 15 of both inner links 13a and 14a of the crosslinks 12a and 12b. The free ends of the short link 34 are pivotally attached to bearing members 37 provided on the support frame 16 on the conveyance carriage 1 side by a support shaft 38 positioned below the central fulcrum shafts 15 of the crosslinks 12a and 12b.

Parallel to the crosslink mechanism 10, an automatic lock means 39 which locks the object support base 11 that has reached the rising limit position is provided. For this automatic lock means 39, locked portions 40 are set on the common sliding fulcrum shaft 19 laid between both outer links 13b and 14b constituting the crosslinks 12a and 12b, and the automatic lock means has a pair of left and right lock members which automatically engage with the locked portions 40. The lock members 41 have the same structure in which they are separated to the left and right of the second cam follower roller 32 so as to be positioned between the pair of left and right first cam follower rollers 30a and 30b and the one second cam follower roller 32, and the lock members are axially supported on the bearing members 42 provided on the support frame 16 on the conveyance carriage 1 side so as to swing up and down by left and right horizontal support shafts 43 concentric with each other, and are held by the gravity at locking positions at which the lock members 41 extend rearward horizontally from the support shafts 43. The lock members 41 are continuously and integrally provided with arms 41 turned downward, and on the lower ends of the arms 41a, unlocking cam follower rollers 44 are axially supported via left and right horizontal support shafts concentric with each other. The unlocking cam follower rollers 44 are positioned lower than the bottom surface of the conveyance carriage 1 and higher than the conveyance carriage supporting level L when the lock members 41 are at the locking positions.

In the traveling path of the conveyance carriage 1, a work zone in which work such as part assembly is performed for an object loaded on the object support base 11 is set, and on the upstream side of the work zone, an object loading station is set. Before the conveyance carriage 1 arrives at the object loading station, the object support base 11 that has lowered due to gravity to the lowering limit position as shown in FIG. 8 is switched to the rising limit position shown in FIG. 4. This is also for securing a fork lowering space below the object support base 11 when an object is loaded on the object support base 11 by a forking operation of a forklift or the like. To push up the object support base 11 to the rising limit position, a pair of left and right side guide rails 52 shown by imaginary lines in FIG. 5 and FIG. 8 and one center cam rail 50 shown by imaginary lines in FIG. 4 and FIG. 5 are used. The pushing of the object support base 11 to the rising limit position by these cam rails 50 and 52 is not described herein but will be described later.

When the object support base 11 is pushed up to the rising limit position, the common sliding fulcrum shaft 19 on the support frame 16 side in the crosslink mechanism 10 slides horizontally to the position-fixed fulcrum shaft 18 side, however, immediately before the object support base 11 reaches the rising limit position, the locked portions 40 of the common sliding fulcrum shaft 19 pass while pushing-up the lock members 41 of the automatic lock means 39 against gravity, and when the object support base 11 reaches the rising limit position, the lock members 41 swing and return downward and automatically engage with the locked portions 40 of the common sliding fulcrum shaft 19. In other words, the object support base 11 is automatically locked at the rising limit position. In this state, as shown in FIG. 4 and FIG. 5, the pair of left and right first cam follower rollers 30a and 30b have risen to positions slightly higher than the bottom surface of the conveyance carriage 1 and the one second cam follower roller 32 has risen to a position higher than the conveyance carriage supporting level L although it is slightly projecting downward from the bottom surface of the conveyance carriage 1. The other vertical axis rollers 9a through 9d projecting below the conveyance carriage 1 and the unlocking cam follower rollers 44 are also positioned higher than the conveyance carriage supporting level L, so that when the object support base 11 is at the rising limit position, nothing projects further downward than the conveyance carriage supporting level L.

Figure 6:
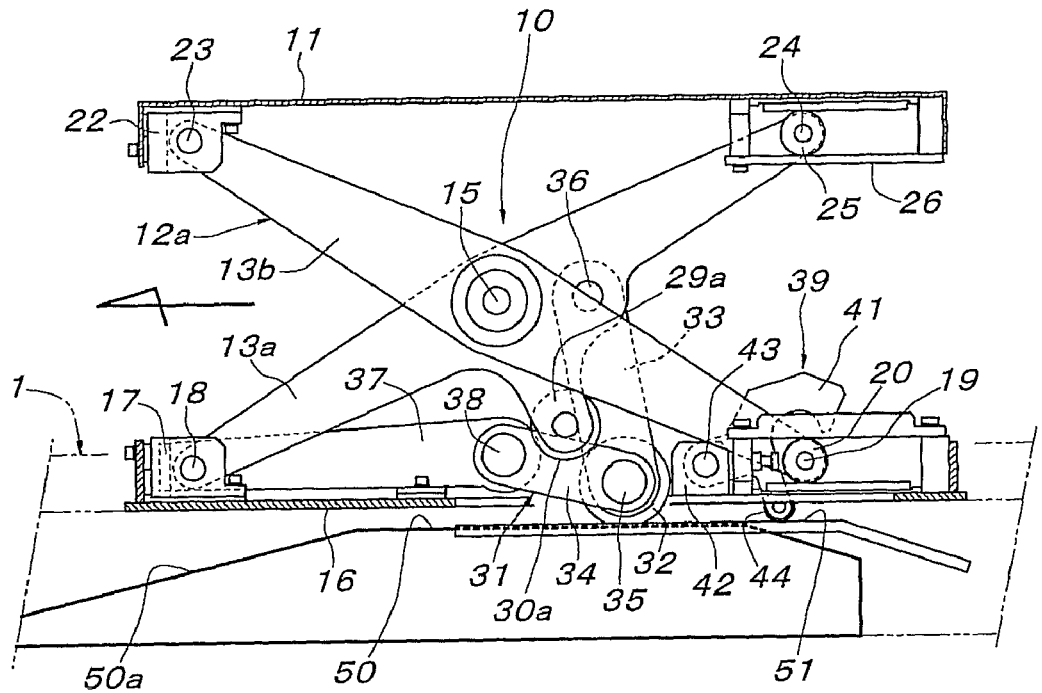
FIG. 6 is a longitudinal sectional side view of the main portion showing a state immediately before the object support base is lowered from the rising limit position.

As described above, when the conveyance carriage 1 in a state that the object support base 11 is locked at the rising limit position arrives at the object loading station set in the traveling path, an object is loaded on the object support base 11 at the rising limit position. At this time, lowering of the object support base 11 due to the weight of the object is blocked by the lock members 41 of the automatic lock means 39. The conveyance carriage 1 in which the object is loaded on the object support base 11 at the rising limit position is advanced into the work zone and a predetermined work is performed for the loaded object, and when the object level must be lowered from the rising limit position according to the work contents, as shown by the imaginary lines of FIG. 5 and as shown in FIG. 6, a cam rail which can receive the second cam follower roller 32 at a risen position, specifically, a center cam rail 50 with a height to push up the object support base 11 to the rising limit position, and unlocking cam rails 51 which push up the cam follower rollers 44 of the automatic lock means 39 in a state that the center cam rail 50 can support the second cam follower roller 32, are laid on the traveling path floor.

Along with traveling of the conveyance carriage 1, first, the second cam follower roller 32 at the risen position shifts to the side above the center cam rail 50, and then, the unlocking cam follower rollers 44 of the automatic lock means 39 get onto the unlocking cam rails 51 and the lock members 41 are pushed up from the locking positions against gravity, and the lock members 41 are released upward from the common sliding fulcrum shaft 19 (locked portions 40) on the support frame 16 side of the crosslink mechanism 10, whereby the object support base 11 at the rising limit position is unlocked. From this moment, the second cam follower roller 32 is supported at substantially the same level by the center cam rail 50 just below the second cam follower roller, so that the object support base 11 is substantially left held at the rising limit position, however, along with subsequent traveling of the conveyance carriage 1, the second cam follower roller 32 shifts to a descending slope 50a (see FIG. 6 and FIG. 7) of the center cam rail 50, and accordingly, the object support base 11 lowers parallel while pushing down the crosslink mechanism 10 into a folded posture by its loading weight.

Along with the lowering of the object support base 11, the pair of left and right crosslinks 12a and 12b in the crosslink mechanism 10 rotates relative to each other around the central fulcrum shafts 15 and fall down into the horizontal postures from the standing postures, and the lowering of the object support base 11 according to the descending slope 50a of the center cam rail 50 is limited when the short link 34 of the toggle link 31 which changes in posture according to the falling-down movements of the crosslinks 12a and 12b is turned into the vertical posture. At this time, the lowering amount of the second cam follower roller 32 becomes maximum, comes closest to the floor surface of the traveling path, and separates from the terminal end of the descending slope 50a of the center cam rail 50. On the other hand, along with the falling-down movements of the crosslinks 12a and 12b, the pair of left and right first cam follower rollers 30a and 30b also lower and project downward from the bottom surface of the conveyance carriage 1. Therefore, the pair of left and right side cam rails 52 which can receive the pair of left and right first cam follower rollers 30a and 30b projecting downward from the bottom surface of the conveyance carriage 1 as shown in FIG. 7 before the second cam follower roller 32 separates from the terminal end of the descending slope 50a of the center cam rail 50, are laid on the traveling path floor surface, and the object support base 11 is supported by the side cam rails 52 via the pair of left and right first cam follower rollers 30a and 30b.

Thus, along with the traveling of the conveyance carriage 1, the pair of left and right first cam follower rollers 30a and 30b shift to descending slopes 52a (see FIG. 7) of the side cam rails 52, and accordingly, the object support base 11 lowers in parallel while further pushing down the crosslink mechanism 10 into a fall-down posture by its loading weight. Then, when the object support base 11 reaches the lowering limit position shown in FIG. 8, the first cam follower rollers 30a and 30b separate from the terminal ends of the descending slopes 52a of the side cam rails 52, and the object support base 11 that has reached the lowering limit position is supported by a receiver (not shown) provided on the conveyance carriage 1 side. At this time, the short link 34 of the toggle link 31 turns into a posture of slightly swinging forward from the vertical posture, and the second cam follower roller 32 has risen slightly higher than the position closest to the traveling path floor surface, and the pair of left and right first cam follower rollers 30a and 30b are at positions projecting most downward from the bottom surface of the conveyance carriage 1, that is, positions closest to the traveling path floor surface. At this time, the positions of the cam follower rollers 30a, 30b, and 32 are lower than the conveyance carriage supporting level L.

Figure 7:
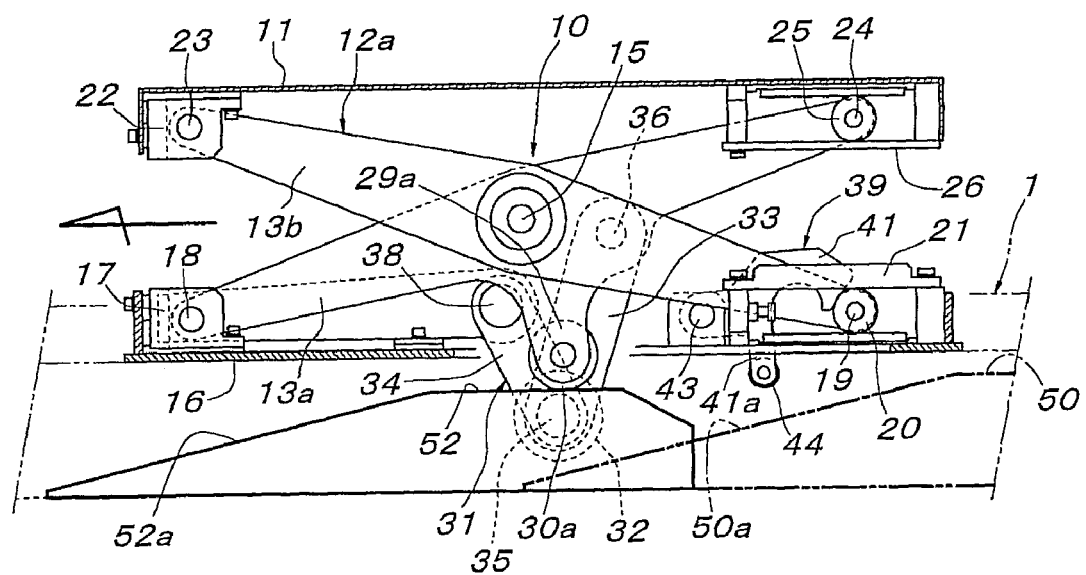
FIG. 7 is a longitudinal sectional side view of the main portion showing a state immediately before the object support base is further lowered from an intermediate height position.

As clearly understood from the description given above, along with the traveling of the conveyance carriage 1 in the work zone, the object support base 11 on which the object is loaded can be lowered from the rising limit position shown in FIG. 4 to the lowering limit position shown in FIG. 8, however, only in a predetermined section, the conveyance carriage is allowed by the center cam rail 50 to travel while holding the object support base 11 at the rising limit position, the conveyance carriage is allowed by the side cam rail 52 to travel while holding the object support base 11 at the intermediate height position shown in FIG. 7, and the conveyance carriage is allowed to travel while holding the object support base 11 at the lowering limit position without laying the cam rails. Further, it is also possible that the heights of the center cam rail 50 and the side cam rails 52 are lowered and the conveyance carriage is made to travel while holding the object support base 11 at an arbitrary height between the rising limit position and the intermediate height position or an arbitrary height between the intermediate height position and the lowering limit position only in a predetermined section. Further, contrary to the description given above, when it is desired to raise the object support base 11 being lower than the rising limit position, and at this time, if the height of the object support base 11 is at the lowering limit position, as shown by the imaginary lines in FIG. 8, the object support base 11 is pushed up to, for example, the intermediate height position by standing the crosslink mechanism 10 via the first cam follower rollers 30a and 30b by an ascending slope 52b of the side cam rail 52, and on the other hand, if the height of the object support base 11 is at the intermediate height position, as shown by the imaginary lines in FIG. 4, the object support base 11 is pushed up to, for example, the rising limit position by further standing the crosslink mechanism 10 via the second cam follower roller 32 by the ascending slope 50b of the center cam rail 50.

Next, a construction of the present invention of an aisle crossing area crossing an aisle in the traveling path of the conveyance carriage 1 will be described with reference to FIG. 9 through FIG. 11. As shown in FIG. 9, in the aisle crossing area X in which the traveling path P of the conveyance carriage 1 crosses an aisle A for a vehicle, etc., the supporting guide rails 2a and 2b and the orientation restricting guide rail 3 are not laid and they are divided by this area, and instead of these, in the aisle crossing area X, a crossing aisle floor member 45 is laid at the same level as the conveyance carriage supporting level L of the supporting guide rails 2a and 2b, and in the front and rear in the aisle direction of the crossing aisle floor member 45, slope floor members 46a and 46b which fill the level differences from the floor surface are laid. The crossing aisle floor member 45 includes a pair of left and right conveyance carriage supporting band-like floor members 47a and 47b which connect the wheel support surfaces of the supporting guide rails 2a and 2b at the same level in the front and rear in the conveyance carriage traveling direction of the aisle crossing area X, and floor member main body 48 constituting the crossing aisle floor surface together with the conveyance carriage supporting band-like floor members 47a and 47b, and the conveyance carriage supporting band-like floor members 47a and 47b are separated from the floor member main body 48 and supported by support rail members 49a and 49b laid on the floor surface.

To allow the conveyance carriage 1 to travel and pass through the aisle crossing area X in a state that the object support base 1 is locked at the rising limit position, if the object support base 11 of the conveyance carriage 1 which travels close to the aisle crossing area X is not at the rising limit position, on the upstream side traveling path P in the aisle crossing area X, as shown in FIG. 10, the side cam rails 52 (elevating first cam rails) 52 which push up the object support base 11 at, for example, the lowering limit position to the intermediate height position along with the traveling of the conveyance carriage 1, and the center cam rail (elevating second cam rail) 50 which pushes up the object support base 11 at the intermediate height position to the rising limit position along with the traveling of the conveyance carriage 1 are laid. As a matter of course, the object support base 11 of the conveyance carriage 1 that has passed through the aisle crossing area X can be unlocked from the rising limit position by using the unlocking cam rails 51 and lowered to the intermediate height position and lowering limit position by using the elevating cam rails 52 and 50 as appropriate.

According to the construction described above, a vehicle, etc., which crosses the conveyance carriage traveling path P on the aisle A, can be made to cross the path smoothly and safely by using the continuous conveyance carriage traveling path getting-over aisle floor surface formed by the slope floor members 46a and 46b and the crossing aisle floor member 45 laid in the aisle crossing area X. On the other hand, from the guide rails 2a and 2b on the upstream of the aisle crossing area X, the wheels 8 of the conveyance carriage 1 which crosses the aisle A and travels on the conveyance carriage traveling path P get onto the conveyance carriage supporting band-like floor members 47a and 47b of the crossing aisle floor member 45 at the same level, and pass through the aisle crossing area X on the conveyance carriage supporting band-like floor members 47a and 47b, and accordingly, the conveyance carriage can get onto the guide rails 2a and 2b continued to the downstream side of the aisle crossing area X at the same level and travel horizontally. As a matter of course, in the conveyance carriage 1 which passes through the aisle crossing area X, the object support base 11 is switched in advance to the rising limit position, so that no members project lower than the conveyance carriage supporting level L of the guide rails 2a and 2b, so that the conveyance carriage can be made to safely travel without interference of the members on the conveyance carriage 1 side with the crossing aisle floor member 45 laid at the conveyance carriage supporting level in the aisle crossing area X.

The orientation restricting guide rail 3 which the orientation restricting vertical axis rollers 9a through 9d of the conveyance carriage 1 engage with is absent in the aisle crossing area X, so that when the conveyance carriage 1 passes through the aisle crossing area X, there is concern that the orientation of the conveyance carriage 1 changes unexpectedly and the vertical axis rollers 9a through 9d do not successfully get onto the orientation restricting guide rail 3 on the downstream side from the orientation restricting guide rail 3 on the upstream side of the aisle crossing area X, however, in the embodiment of the present invention, among the plurality of vertical axis rollers 9a through 9d arranged in series at substantially even intervals, at least two vertical axis rollers always engage with either one of the orientation restricting guide rails 3 in the front and rear of the aisle crossing area X or always engage with both orientation restricting guide rails 3 in the front and rear of the aisle crossing area X, so that there is no possibility that the conveyance carriage 1 changes its orientation unexpectedly when passing through the aisle crossing area X.

For example, in the illustrated embodiment, when the intervals of the four vertical axis rollers 9a through 9d arranged in series at substantially even intervals are defined as d, and the width in the conveyance carriage traveling direction of the crossing aisle floor member 45 (the dividing path length of the orientation restricting guide rail 3 divided by the aisle crossing area X) is defined as D, even if D>d, only by setting the intervals of the four vertical axis rollers 9a through 9d so as to satisfy the condition of d×2>D, in a period since the conveyance carriage 1 starts passing through the aisle crossing area X until it completely passes through the aisle crossing area X, at least two of the vertical axis rollers 9a through 9d are engaged with the orientation restricting guide rail 3 to maintain the orientation of the conveyance carriage 1 constantly, and when the conveyance carriage 1 completely passes through the aisle crossing area X, the four vertical axis rollers 9a through 9d can be reliably engaged with the orientation restricting guide rail 3 on the downstream side of the aisle crossing area X. As a matter of course, the number of vertical axis rollers is not limited to 4, and may be 5 or more.

INDUSTRIAL APPLICABILITY

The carriage-type conveyance device of the present invention can be utilized in an automobile assembly line in which the level of supporting an object (automobile body, etc.) must be switched in the conveyance path.

What is claimed is:

1. A carriage conveyance device comprising a conveyance carriage which is supported so as to travel on guide rails laid on a floor surface and is provided with an object support base movable vertically, elevating cam follower rollers which move vertically in conjunction with a vertical movement of the object support base, an automatic lock means which locks the object support base being raised at a rising limit position, and unlocking cam follower rollers for unlocking the automatic lock means, and laid on a conveyance carriage traveling path side are elevating cam rails which push up the elevating cam follower rollers and unlocking cam rails which switch the unlocking cam follower rollers to unlocking positions, wherein the unlocking cam follower rollers are disposed higher than a conveyance carriage supporting level of the guide rails, the elevating cam follower rollers project further downward than the conveyance carriage supporting level when the object support base is at a lowering limit position, and positioned higher than the conveyance carriage supporting level when the object support base is at a rising limit position, and in an aisle crossing area crossing an aisle in a conveyance carriage traveling path, a crossing aisle floor member is laid at the same level as the conveyance carriage supporting level, and in front and rear of this crossing aisle floor member, slope floor members are provided for filling a level difference between the floor surface and the conveyance carriage supporting level, and in this aisle crossing area, elevating cam rails which push up the object support base to the rising limit position are laid on an upstream side of the aisle crossing area so that the conveyance carriage can pass through the area in a state that the object support base is locked at the rising limit position by the automatic lock means.

2. The carriage conveyance device according to claim 1, wherein as wheels on a conveyance carriage side to roll on the guide rails, flange-less wheels which have only peripheral surfaces to roll on wheel support surfaces of the guide rails are used, and on a bottom of the conveyance carriage, a plurality of vertical axis rollers are arranged in series at appropriate intervals in a traveling direction and are higher than the conveyance carriage supporting level, and on the conveyance carriage traveling path excluding the aisle crossing area, an orientation restricting guide rail which restricts an orientation of the conveyance carriage by engaging with the vertical axis rollers is laid, and intervals and a number of vertical axis rollers can be set so that at least two vertical axis rollers always engage with the orientation restricting guide rail in the front or rear of the aisle crossing area or across the aisle crossing area when the conveyance carriage passes through the aisle crossing area.

3. The carriage conveyance device according to claim 2, wherein the guide rails are laid on the conveyance carriage traveling path excluding the aisle crossing area, and inside the aisle crossing area, the wheels on the conveyance carriage side roll and move on the crossing aisle floor member.

4. The carriage conveyance device according to claim 3, wherein the crossing aisle floor member includes conveyance carriage supporting band floor members which connect the wheel support surfaces of the guide rails in the front and rear of the aisle crossing area, and support rail members which support the conveyance carriage supporting band-like floor members are laid on the floor surface.

* * * * *